United States Patent Office 2,911,583
Patented Nov. 3, 1959

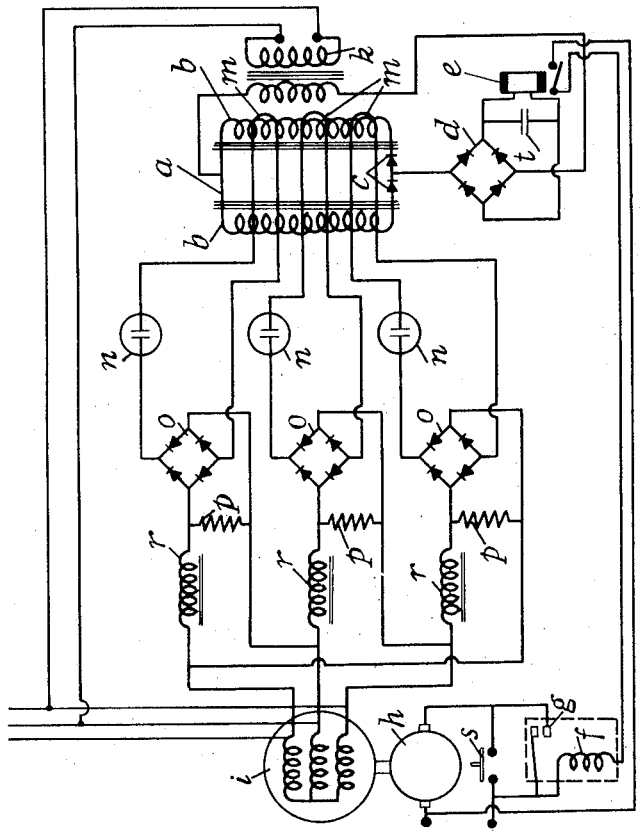

2,911,583

PROTECTIVE MEANS FOR USE IN AN ELECTRIC SYSTEM SUPPLIED BY AN INVERTOR

William Corbett Hankins, Watford, England, assignor to Rotax Limited, Willesden, London, England Application February 4, 1957, Serial No. 638,128

1 Claim. (Cl. 321—31)

This invention has for its object to provide protective means for use in an electric system supplied by an invertor, the means being required to interrupt the action of the driving motor of the invertor in the event of the associated alternating current generator developing a voltage in excess of a predetermined amount.

A protective means in accordance with the invention comprises the combination of a transducer, a motor controlling circuit breaker operable by the transductor, and at least one transductor control winding, a neon or other gas discharge bulb in series with the said winding or each such winding, a saturable inductance and a resistance in series therewith responsive to the impressed voltage, and a rectifier having its input terminals connected to the ends of the resistance and its output terminals connected to the bulb and control winding.

In one example as illustrated by the accompanying diagram, a transductor $a$ is provided with a pair of windings $b$ which are interconnected at one pair of ends and which at their other ends are interconnected through a pair of half-wave rectifiers $c$. The mid-point of the latter is connected through a full-wave rectifier $d$ to an electromagnetic relay $e$ which controls the supply of current to the electromagnet $f$ of a circuit breaker $g$ connected to the motor $h$ of the invertor generator $i$.

In the example shown the latter is a polyphase generator, but it may be a single phase generator. The other mid-point of the windings $b$ and one end of the full-wave rectifier $d$ are connected to the secondary winding of a transformer $k$, the primary winding of which is connected across one of the phases of the generator.

In addition the transductor is provided with a control winding $m$ or a plurality of such windings corresponding with the number of phases in the generator. Each such winding is energised by current from the generator through a circuit which includes a neon or other gas discharge bulb $n$ in series with the said winding (the bulb having a definite striking voltage), a rectifier $o$, a resistance $p$ in parallel with the rectifier and which determines the voltage applied to the bulb, and a series inductance $r$ mounted on a saturable core, the inductance being situated between one end of the resistance and the generator.

Starting of the motor is effected by temporary actuation of a switch $s$. Current supplied by the generator then causes the transformer $k$ to effect closing of the switch $g$ for keeping the motor in action.

The arrangement is such that so long as the generator voltage remains normal, the gas-discharge bulb is inoperative. But in the event of the voltage exceeding a predetermined amount, the bulbs $n$ come into action, causing the associated windings $m$ of the transductor to be energised. The effect of this is to reduce the current in the winding of the relay $e$ and so cause the relay to become inoperative. The switch $g$ thereupon opens under the action of a spring and so causes the current supplied to the motor $h$ to be interrupted.

To minimise risk of release of the relay $e$ in response to a transient over-voltage it may have combined with it any convenient time lag device such as a condenser $t$, so that release only occurs when the over-voltage is persistent, and during this interval the gas discharge bulb will be extinguished as a consequence of the impressed voltage resuming its previous condition.

When it is desired that the apparatus shall be responsive also to the generator frequency, an additional control winding is then mounted on the transductor, such winding being in a circuit containing a neon or other gas discharge bulb and an appropriate frequency responsive means.

Having thus described my invention what I claim as new and desire to secure by Letters Patent is:

In an electric system including an invertor of the motor-generator type provided with a motor current supply circuit and a generator current output circuit, protective means comprising in combination a transformer, a transductor having windings connected to the transformer to receive current therefrom, and also having at least one control winding adapted, when energised, to reduce the current in the transductor, a circuit breaker connected to the motor current supply circuit, means responsive to current in the transductor for retaining the circuit breaker in a closed condition, a gas discharge bulb connected in series with the control winding of the transductor, a saturable inductance and a resistance connected in series with each other, and also connected to the generator to receive current therefrom, and a rectifier having input terminals respectively connected to the ends of the resistance and output terminals respectively connected to the gas discharge bulb and the control winding of the transductor, so that in the event of undesired increase in the voltage of the generator the bulb is brought into action and the control winding is energised to reduce the current in the transductor, and thereby cause the circuit breaker to interrupt the motor current supply circuit.

References Cited in the file of this patent

UNITED STATES PATENTS

| 2,722,648 | Dunigan | Nov. 1, 1955 |
| 2,727,202 | Lanfers et al. | Dec. 13, 1955 |
| 2,869,067 | Robinson | Jan. 13, 1959 |

FOREIGN PATENTS

| 618,101 | Great Britain | Feb. 16, 1949 |